(12) United States Patent
Kopetzky et al.

(10) Patent No.: US 7,207,515 B2
(45) Date of Patent: Apr. 24, 2007

(54) DRIVE UNIT FOR A SAFETY BELT TENSIONER

(75) Inventors: Robert Kopetzky, Lonsee (DE); Roland Schnabl, Ulm (DE); Andreas Wengert, Mutlangen (DE); Gunter Maierhofer, Ulm (DE); Dieter Beck, Gerstetten (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 821 days.

(21) Appl. No.: 10/076,270

(22) Filed: Feb. 19, 2002

(65) Prior Publication Data

US 2002/0113157 A1 Aug. 22, 2002

(30) Foreign Application Priority Data

Feb. 19, 2001 (DE) .................. 101 07 656

(51) Int. Cl.
*B60R 22/46* (2006.01)
*F01B 29/00* (2006.01)

(52) U.S. Cl. .............. 242/374; 60/632; 280/806

(58) Field of Classification Search ............... 242/374; 297/478; 280/806; 92/90; 60/632; 277/604, 277/650, 654, 904, 917
See application file for complete search history.

(56) References Cited

U.S. PATENT DOCUMENTS 2,889,163 A * 6/1959 Stephens et al. ............ 277/573
5,553,803 A * 9/1996 Mitzkus et al. ............. 242/374
5,676,397 A * 10/1997 Bauer ......................... 280/806
6,250,720 B1 * 6/2001 Wier ........................... 297/468

FOREIGN PATENT DOCUMENTS

| DE | 44 44 775 A1 | 6/1996 |
|---|---|---|
| DE | 196 41 227 A1 | 4/1997 |
| DE | 196 43 402 A1 | 4/1998 |
| DE | 198 26 305 A1 | 12/1998 |
| DE | 199 61 109 A1 | 6/2001 |
| EP | 0 992 406 A | 4/2000 |
| JP | 2000-167889 | 8/2000 |
| JP | 2001-213278 | 8/2001 |

* cited by examiner

*Primary Examiner*—John Q. Nguyen
*Assistant Examiner*—Scott Haugland
(74) *Attorney, Agent, or Firm*—Foley and Lardner LLP

(57) ABSTRACT

The invention relates to a drive unit for a safety belt tensioner which has a drive which can be triggered on the response of an acceleration sensor and which can be rotationally fixedly coupled to the belt winding reel. The drive is located in a drive chamber which is formed by two plates, which extend parallel to one another and which are provided with a coating material, and which has a drive band of which at least one end is fastened to a drive shaft.

10 Claims, 1 Drawing Sheet

DRIVE UNIT FOR A SAFETY BELT TENSIONER

BACKGROUND OF THE INVENTION

The invention relates to a drive unit for safety belt tensioners which have a drive which can be triggered on the response of an acceleration sensor and which can be rotationally fixedly connected to the belt winding reel. The drive is located in a drive chamber which is formed by two plates, which extend parallel to one another and which are connected to one another, and which has a drive band of which at least one end is fastened to a drive shaft. On the response of the acceleration sensor, the drive band is exposed from one side to an expanding gas coming from a gas generator such that the drive band unwinds and thereby drives the drive shaft. Drive units of this kind are generally known (cf. DE-A-199 61 109.2).

The performance of such a drive unit depends, among other things, on the amount of the pressure which builds up through the expanding gas inside the space which is formed by the plates and a loop formed by the drive band. The pressure building up is, however, reduced by gas which escapes via the interface drive band/plates.

A possibility to improve the quality of the gas seal between the drive band and the plates lies in the fact of using a two-ply drive band which is provided with an additional rubber-like sealing belt which is disposed between the plies of the drive band and which projects a little at the edges of the drive band and in this way provides a more effective sealing effect of the drive band and thus a reduced gas loss via the interface drive band/plates.

The disadvantage of such an apparatus is, however, the relatively complex manufacture of the multi-ply drive bands. An optimum sealing effect can only be achieved with an exact parallelism and absolutely constant width of the three belts. The low tolerances required for an effective sealing effect of the drive band make the production of such drive band complex and expensive.

SUMMARY OF THE INVENTION

It is therefore the underlying object of the invention to provide a drive unit for safety belt tensioners with increased performance with a simplified set-up.

In accordance with the invention, the surfaces of the plates at the chamber side are partly or fully coated with a coating material which reduces a gas exchange via the interface drive band/plates. A high pressure can also build up when using a single ply drive band due to this design. Furthermore, production tolerances in the width of the drive band and in the parallelism of the plates can be compensated by the coating of the plates. The present invention therefore allows a simplified manufacture of drive units for safety belt tensioners while simultaneously ensuring a high performance due to a good sealing effect of the drive band.

In accordance with a first advantageous embodiment, the coating material can have a plurality of layers, with the individual layers consisting of different materials. This allows a direct matching of the coating to the drive band with the aim of achieving an improved sealing effect of the drive band.

It is particularly advantageous if the coating material and/or the thickness of the coating of a plate varies in different plate sections. The gas exchange via the interface drive band/plates can vary in the different plate sections in this manner. This results in a pre-determinable pressure development during the drive band unwinding procedure, which allows a controllable, dynamic tightening of the safety belt.

In a preferred constructional design of the invention, the coating material is applied to the plates in the form of one or more films. The use of adhesive films or of adhesives to apply the films represents a particularly simple way of coating plates.

It is particularly advantageous if the coating material is soft. That is to say, then the edges of the drive band can partly penetrate into the coating material and thus additionally reduce the gas exchange via the interface drive band/plates.

In accordance with a further preferred embodiment of the invention, a surface-near layer of the coating material can be removed by the drive band and piles up in front of the drive band on the triggering of the drive in the unwinding direction. This pile forms a further protection against gas loss via the interface drive band/plates. A maximum pressure can be built up in this manner.

BRIEF DESCRIPTION OF THE DRAWINGS

The present invention is described in the following purely by way of example by means of an advantageous embodiment with reference to the enclosed drawings, in which are shown.

DETAILED DESCRIPTION

In the embodiment shown here, the drive units are pyrotechnically driven ones such as are described in the German patent application 199 61 109.2, which is also made the subject of this application by reference.

Figure 1:
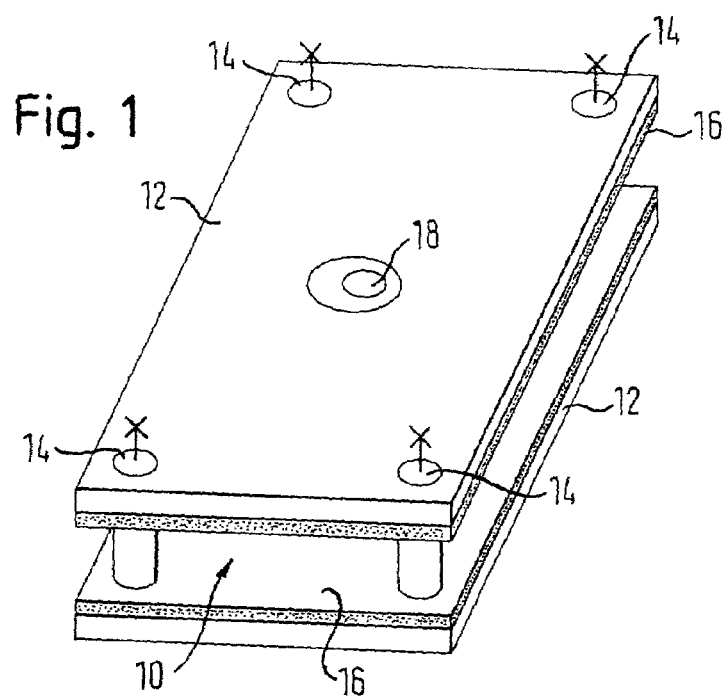
FIG. 1 a schematic, perspective view of a drive chamber of the invention.

A drive chamber 10 is shown in FIG. 1 which has two plates 12 which extend parallel to one another and which are connected to one another by bolts 14 and spacers (not shown). The plates 12 are coated on their surface at the chamber side with a coating material 16.

A drive shaft 18 extends perpendicular to the plates 12 inside the drive chamber and can be rotationally fixedly coupled to the belt winding reel (not shown) via a coupling (not shown) on the response of an acceleration sensor (not shown).

Figure 2:
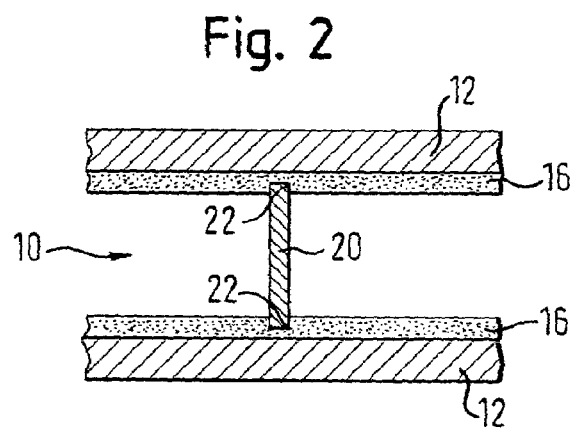
FIG. 2 a schematic cross-sectional view of a drive chamber of the invention.

A drive band 20 (FIG. 2) extends perpendicularly to the plates and stands between the plates 12, whose width is matched to the spacing of the plates such that the drive band edges 22 come into contact with the coating material 16 of the plates 12. As FIG. 2 shows, the drive band edges 22 can penetrate into the coating material 16, provided that, as in the embodiment shown, it is a soft coating material 16.

At least one end of the drive band 20 is fastened to the drive shaft 18. The drive band 20 forms a small, closed loop between its fastening points (not shown) on the drive shaft 18 in the state of rest. Gas outlet orifices of a gas generator (not shown) open inside this loop, with the gas generator being fitted between the plates 12 next to the drive shaft 18.

If the gas generator is ignited due to an accident, gas discharges from the gas outlet orifices into the inside of the loop, whereupon the loop expands while exerting a torque onto the drive shaft 18 in the belt wind up direction.

When the loop expands, the drive band edges 22 are located in a sealing slide engagement with the coating material 16 of the plates 12, with tolerances in the width of the drive band 20 or in the parallelism of the plates 12 being compensated by the coating material 16 of the plates 12 such that the pressure required to tighten the belt can also be built up inside the loop when single-ply drive bands 20 are used.

Figure 3:
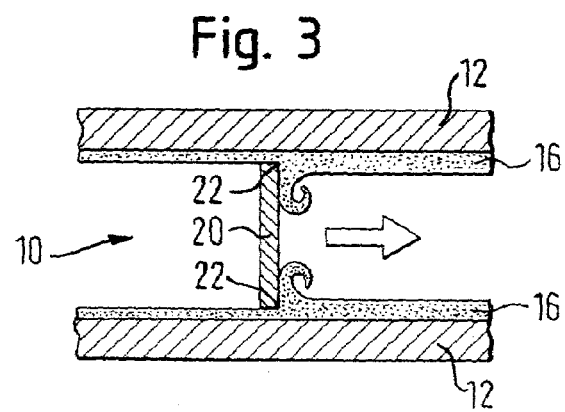
FIG. 3 a schematic cross-sectional view of the drive chamber of FIG. 2, with the drive band already being moved by a distance.

FIG. 3 shows the embodiment of FIG. 2, with, however, the drive band 20 already having covered a path distance. The drive band edges 22 penetrate partly into the coating material 16, with a surface-near layer of the coating material 16 being removed by the drive band 20. In this way, coating material 16 piles up in front of the drive band 20 when the loop expands in the expansion direction (FIG. 3), which additionally reduces the gas loss via the interface drive band/plates. An elevated pressure can build up inside the loop in this manner, whereby the performance of the drive unit is increased.

The invention claimed is:

1. A drive unit for a safety belt tensioner having a drive and being capable of being triggered, the drive unit comprising:
    a drive chamber configured to contain the drive and including two connected plates extending parallel to one another;
    wherein the drive chamber includes a drive band having at least one end fastened to a drive shaft;
    wherein an interior of the drive chamber is adapted to be exposed to an expanding gas coming from a gas generator;
    wherein the surface of each plate that faces the other plate is coated with a coating material configured to reduce the amount of gas that escapes through an interface between the edges of the drive band and the facing plate surfaces.

2. The drive unit of claim 1, wherein the coating material has a plurality of layers.

3. The drive unit of claim 2, wherein the coating material has layers of different materials.

4. The drive unit of claim 1, wherein the thickness of the coating material varies in different sections of the surfaces of the plate.

5. The drive unit of claim 1, wherein the coating material has one or more films.

6. The drive unit of claim 5, wherein the films for the coating of the plates are adhesive or are applied by means of an adhesive.

7. The drive unit of claim 1, wherein the coating material is soft.

8. The drive unit of claim 1, wherein the drive band includes edges partly penetrating into the coating material.

9. The drive unit of claim 1, wherein a surface-near layer of the coating material is configured to be removed by the drive band and pile up in front of the drive band in the direction of expansion on the triggering of the drive and thus additionally reduces the gas exchange through an interface between the band and the plate surfaces.

10. A safety belt tensioner having a drive unit comprising:
    a drive chamber configured to contain the drive unit and including two connected plates extending parallel to one another;
    wherein the drive chamber includes a drive band having at least one end fastened to a drive shaft;
    wherein an interior of the drive chamber is adapted to be exposed to an expanding gas coming from a gas generator;
    wherein the surface of each plate that faces the other plate is coated with a coating material configured to reduce the amount of gas that escapes through an interface between the edges of the drive band and the facing plate surfaces.

* * * * *